Sept. 29, 1959     O. M. LEWIS     2,906,321
TOOL FOR REMOVING LOOSENED TIRES FROM RIMS
Filed Aug. 12, 1957     2 Sheets-Sheet 1

INVENTOR.
ORVAL M. LEWIS
BY
ATTORNEY

Sept. 29, 1959 O. M. LEWIS 2,906,321
TOOL FOR REMOVING LOOSENED TIRES FROM RIMS
Filed Aug. 12, 1957 2 Sheets-Sheet 2
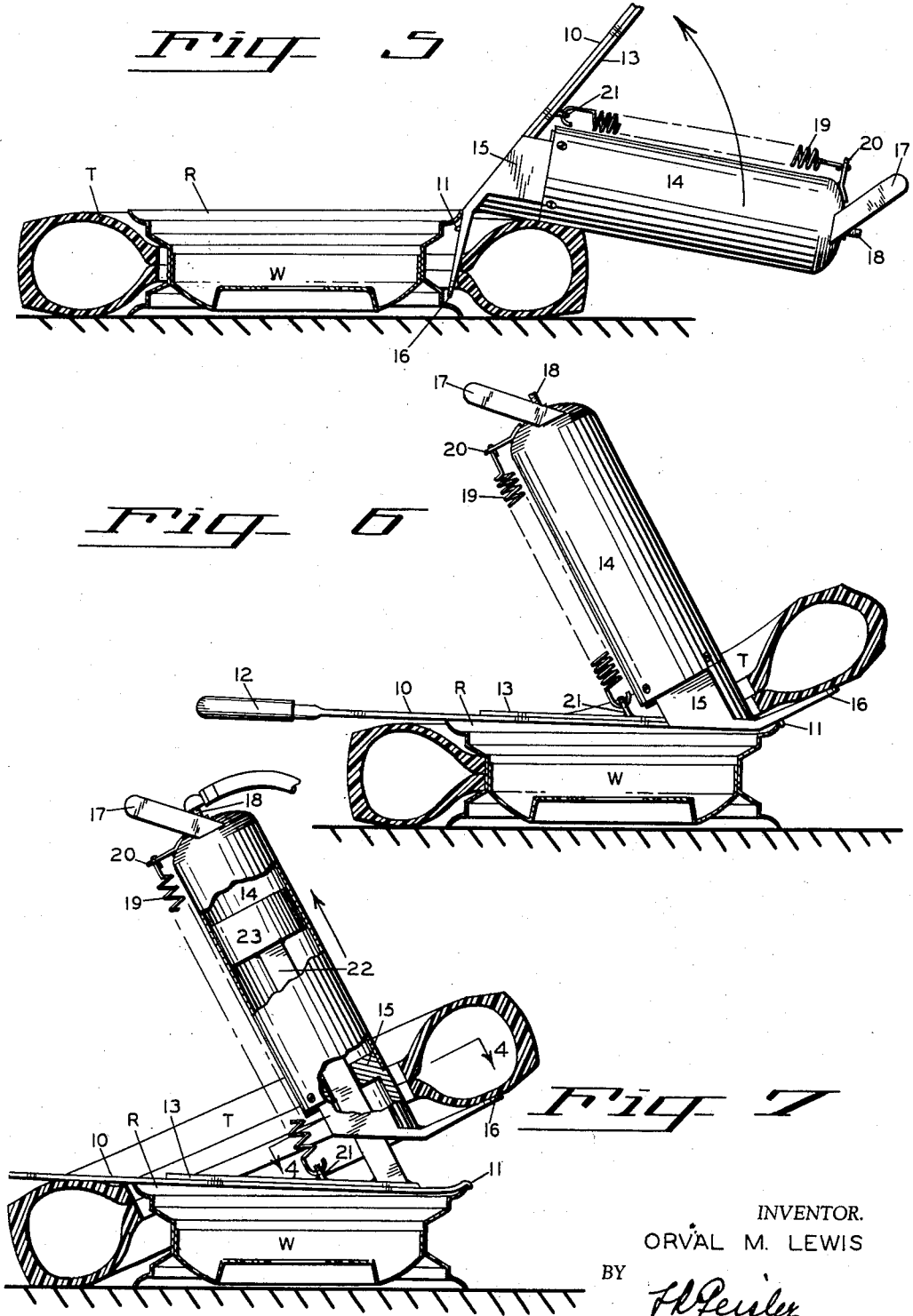
INVENTOR.
ORVAL M. LEWIS
ATTORNEY United States Patent Office 2,906,321
Patented Sept. 29, 1959

2,906,321

TOOL FOR REMOVING LOOSENED TIRES FROM RIMS

Orval M. Lewis, Sweet Home, Oreg.

Application August 12, 1957, Serial No. 677,579

4 Claims. (Cl. 157—1.1)

This invention relates to means for removing a loosened tire from the wheel of a vehicle, and is designed specially, although not exclusively, for tubeless tires which are to be removed from wheels of the "drop center" type.

It is an object of the present invention to provide a practical tire removing tool which will quickly and easily remove the loosened tire while the wheel is resting on its side on the floor, and thus dispense with the requirement of any means for clamping or holding the wheel during the tire removing operation.

Another object of this invention is to provide an improved tire removing tool or device which will be portable and sufficiently light in weight and also sufficiently small in size so that it can be easily carried about by the operator and which will not occupy much storage space, being capable of being conveniently carried in a luggage compartment of an ordinary passenger automobile, when not in use.

A further object of the invention is to provide a tire removing tool which will not require any excessive exertion on the part of the operator during the removal of the tire from the wheel and which will enable the tire to be removed from the tire quickly without any possibility of damage.

An additional and specific object of the invention is to provide a simple, practical and portable tire removing tool which will be operated principally by the use of air under pressure, and thus capable of being used in any garage or automobile service station equipped with the customary air hose and source of air under pressure employed for the inflation of vehicle tires.

These objects and other advantages are attained with the tire removing tool of the present invention constructed and employed in the manner hereinafter briefly described with reference to the accompanying drawings wherein:

Figure 5 is an elevation showing the position in which the device is set by the operator to start the removal of the tire from the wheel, the tire and wheel being shown in section;

Figure 6 is a corresponding elevation showing the next position into which the device is moved by the operator in removing the tire, the tire and wheel being shown in section; and Figure 7 is an elevation of the device, with portions broken away and shown in section, illustrating the manner in which the device functions in completing the freeing of the tire from the wheel.

Figure 1:
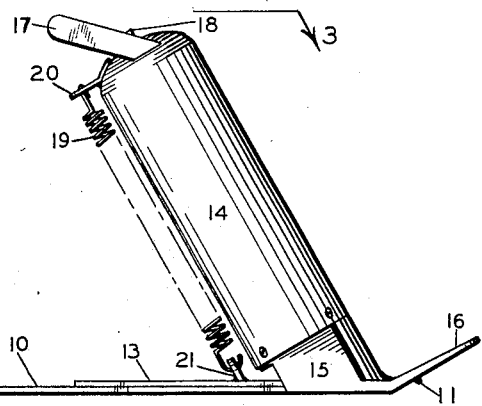
Figure 1 is a side elevation of the device.
Figure 2:
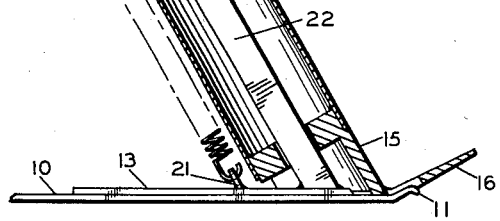
Figure 2 is a corresponding sectional elevation of the same.
Figure 3:
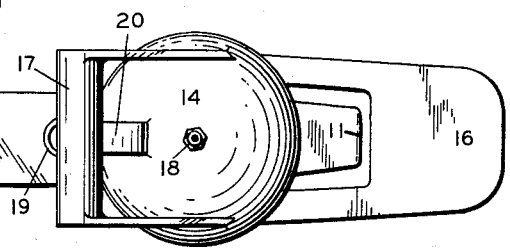
Figure 3 is a foreshortened top plan view looking in the direction indicated by the arrows 3—3 in Figure 1.

Referring first to Figures 1, 2 and 3, the device includes a substantially flat base bar 10, the length of which considerably exceeds the outside diameter of the rim of the wheel from which the tire is to be removed. The forward end of this base bar 10 is formed into a slightly raised hook 11 (shown best in Figure 2) adapted to extend over the edge of the rim of the wheel on the top side of the wheel when the wheel is resting with one side on the floor. The opposite end of the base bar 10 carries a suitable handle 12. A reinforcing plate 13 is secured to, and extends partly along, on top of the base bar 10, preferably corresponding in width to the width of the base bar, as shown in Figure 3.

A piston-supporting bar 22 (Figure 2) is welded rigidly at the bottom to the reinforcing plate 13 and extends upwardly and rearwardly therefrom, thus forming an acute angle, preferably between 45° and 60°, with the plate 13 and base bar 10. The stationary piston 23 is secured at the top of the supporting bar 22.

An air cylinder assembly is slidably mounted on the stationary piston 23 and supporting bar 22. This cylinder assembly includes a cylindrical shell 14 having a closed top, preferably dome-shaped and integral with the cylindrical wall, and a base block 15 of special construction, to the top of which base block the cylindrical wall is rigidly secured, as, for example, by screws.

Figure 4:
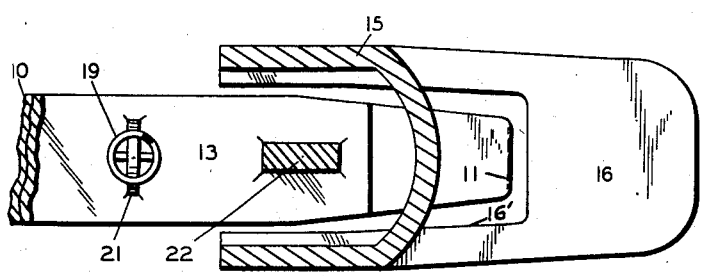
Figure 4 is a partial section of the tool, drawn to an enlarged scale and taken on the line indicated at 4—4 in Figure 7.

The top of this base block 15, which constitutes the bottom wall of the cylinder enclosure, has a central opening, corresponding in area approximately to the cross sectional area of the piston-supporting bar 22, this opening being of a size to allow sufficient clearance for enabling the base block 15 to slide up and down on the bar 22 while preventing any appreciable lateral or radial movement of the bottom of the cylinder with respect to the supporting bar 22. Below this top portion the base block 15 is in the form of a substantially U-shaped wall (see also Figure 4) which extends obliquely upwardly from a bottom toe plate 16, which toe plate is formed integral therewith or rigidly secured thereto. This bottom toe plate 16, as shown in Figures 3 and 4, is provided with an open slot 16' of sufficient size so that this toe plate extends around and is spaced a slight distance from the front end portion of the main base bar 10 and its tip 11. The portion of this toe plate 16 which extends forwardly beyond the U-shaped wall of the base block 15 slopes upwardly, as shown in Figures 1 and 2, and extends in a plane approximately perpendicular to the supporting bar 22 and the axis of the cylinder 14.

An air valve 18, similar to an ordinary tire valve, is mounted in the top of the air cylinder and enables air under pressure from any suitable source to be delivered into the cylinder above the piston 23, and similarly to be exhausted from the cylinder when and as desired by the operator. From Figure 2 it will be apparent that delivery of air under pressure into the cylinder through the valve 18 will cause the entire cylinder assembly to move upwardly with respect to the stationary piston 23 and the supporting bar 22, and with such relative upward movement the base block 15, with the toe plate 16, will move upwardly from the base bar 10 and reinforcing plate 13. Thus, as later described, delivery of air under pressure into the top of the cylinder causes the cylinder assembly and toe plate 16 to move from the position shown in Figures 1 and 2 to a position such as that shown in Figure 7.

A coil spring 19 (Figures 1 and 2) has its upper end attached to a bracket 20 secured to the top of the cylinder 14 and its lower end held in an eye loop 21 secured to the reinforcing plate 13. This coil spring 16 is held under tension at all times. The purpose of this coil spring, as apparent, is to maintain the cylinder assembly and toe plate 16 in the normal lowered position, as shown in Figures 1 and 2, at all times except when air is delivered to the cylinder through valve 18, and then to cause the cylinder assembly to return to this normal low position when the air is allowed to be exhausted through the valve 18. A handle 17 is secured to the top of the cylinder for the convenience of the operator in manipulating the device and also in carrying it about from place to place.

The manner in which the device is employed in the removal of a loosened tire from a vehicle wheel will now be described with reference to Figures 5, 6 and 7. In these figures the wheel, from which the tire is to be removed, is indicated by the reference W and the tire is indicated by the reference T, the wheel and tire being in sectional elevation. The wheel is assumed to be resting on its side on the floor or ground and the wheel rim on the top side, over which the tire must be removed, is indicated at R.

The operator first manipulates the device so as to insert the toe plate 16 down between the beads of the tire and the wheel at one place on the wheel, as illustrated in Figure 5, with the hook 11 of the base bar 10 engaging the rim R of the wheel. The operator next brings the device back into the upright position shown in Figure 6 with the base bar substantially in horizontal position extending diametrically across the top of the wheel. Moving the device into this position causes the toe plate 16 to thrust the engaged portion of the tire T above the rim R, the toe plate 16 and base bar 10 acting as a lever fulcrumed at 11. Due to the relative distance at which the handle 12 is located from the fulcrum point 11, compared to the distance which the toe plate 16 extends beyond this point, this lifting of the engaged portion of the tire by the toe plate 16 does not require the exertion of any great amount of force on the part of the operator. It is now necessary, however, to raise the engaged portion of the tire considerably higher in order to pull the tire entirely over the rim R.

While holding the handle 12 of the device down, with the base bar resting across the top of the wheel, as shown in Figure 6, or by placing his foot on the handle 12 while the device is in this position, and with one hand on the handle 17 of the device, the operator finally connects an air hose, from a suitable source of air under pressure, to the valve 18. The flow of air into the top of the cylinder assembly causes the entire assembly, together with the toe plate 16, to move upwardly from the base bar 10, and thus to move upwardly from the rim of the wheel into the position shown in Figure 7. This results in lifting the tire high enough so that the tire is then free to slide entirely off from the wheel. All this is done very quickly, the entire removing operation, with the employment of an air hose and suitable air pressure, such as is common equipment for garages and service stations, requiring considerably less than one minute of time on the part of the operator.

The tire removing operation takes place with no possibility of damage to the tire beads or to the air seal on tubeless tires. It is not necessary in all cases to have the toe plate 16 engage both beads of the tire, as shown in Figure 5, for even if the toe plate engages only the top bead of the tire the device nevertheless is capable of raising the top bead, at the engaged portion of the tire, a sufficient distance above the rim R of the wheel to cause the bottom bead also to be pulled free from the wheel rim. However, generally, it is preferable to engage both beads with the toe plate, as illustrated, since this facilitates the operation and requires less final upward movement of the cylinder assembly and toe plate. The toe plate 16 extends sufficiently beyond the hook 11 so that, under ordinary conditions, both beads of the tire can be engaged without any difficulty.

At the completion of the tire removing operation the operator opens the valve 18 at the top of the cylinder, allowing the air to exhaust from the cylinder, while the spring 19 quickly returns the cylinder assembly and toe plate 16 to the normal lowered position.

It will also be apparent from the illustrations and description that the entire device will not be very heavy and can therefore be easily carried about by the handle 17. The device also is relatively small, compared to various other tire removing devices, and since no special supporting means and no clamping means are required for the wheel, and since no supporting means is required for the device other than the wheel itself, the device will occupy very little storage space when not in use.

I claim:

1. In a device of the character described for removing a loosened tire from a vehicle wheel, a base member of greater length than the maximum rim diameter of the wheel from which the tire is to be removed, a hook on the forward end of said base member capable of engaging the top side rim of said wheel when said wheel is resting on its side on the floor, an air cylinder assembly mounted for up and down movement on and extending upwardly from said base member, a tire lifting toe plate connected to the bottom of said air cylinder assembly for movement therewith and, when in lowered position, located adjacent the forward portion of said base member and extending forwardly from said hook on said base member, said toe plate adapted to be inserted between the beads of the tire and the wheel rim when said base member is raised with the opposite end of said base member tilted upwardly, and means for delivering air under pressure to said air cylinder assembly, whereby, when said toe plate has been inserted between the tire and the wheel, with said hook on the forward end of said base member engaging the top rim of the wheel, and said base member has been brought down into resting position extending diametrically across the top side of the wheel, the delivery of air under pressure into said air cylinder assembly will cause said toe plate to be raised upwardly from said base and to free the tire from the wheel.

2. In a tire removing tool of the character described, a base bar of greater length than the maximum rim diameter of the wheel from which the tire is to be removed, a hook on the forward end of said base bar capable of engaging the top side rim of said wheel when said wheel is resting on its side on the floor, a piston rod rigidly mounted on said base bar and extending upwardly therefrom, a stationary piston mounted at the top of said rod, an air cylinder slidably mounted on said stationary piston, a base block for said cylinder slidably mounted on said piston rod, a toe plate rigidly mounted on and extending forwardly from said base block, said toe plate extending forwardly beyond the forward end of said base bar, and means for delivering air under pressure into the top of said cylinder so as to cause said air cylinder and therewith said base block and said toe plate to be raised upwardly with respect to said base bar, whereby, when said toe plate has been inserted between the tire and the wheel, with said hook on the forward end of said base bar engaging the top rim of the wheel, and said base bar has been brought down into resting position extending diametrically across the top side of the wheel, the delivery of air under pressure into said air cylinder will cause said toe plate to free the tire from the wheel.

3. A device for removing a loosened tire from a vehicle wheel, said device including a base member of greater length than the maximum rim diameter of the wheel from which the tire is to be removed, means on the forward portion of said base member capable of engaging the top side rim of said wheel when said wheel is resting on its side on the floor, a handle on the opposite rear end of said base member, a piston rod rigidly mounted on said base member and extending upwardly therefrom, a stationary piston mounted at the top of said rod, an air cylinder assembly slidably mounted on said stationary piston and piston rod, a toe plate rigidly mounted on the lower end of said cylinder assembly overlying and extending forwardly from said means on the forward portion of said base member, means for delivering air under pressure to said air cylinder assembly to cause said toe plate to be raised upwardly from said base member, whereby, when said toe plate has been inserted between the tire and the wheel, with said means on the forward portion of said base member engaging the top rim of the wheel, and said base member has been brought down into resting position extending diametrically across the top side of the wheel, the delivery of air under pressure into said air cylinder assembly will cause said toe plate to free the tire from the wheel, and means for returning said air cylinder assembly and therewith said toe plate to normal position when the air is allowed to exhaust from said air cylinder assembly.

4. A device for removing a loosened tire from a vehicle wheel, said device consisting of a base bar of greater length than the maximum rim diameter of the wheel from which the tire is to be removed, a hook on the forward end of said base bar capable of engaging the top side rim of said wheel when said wheel is resting on its side on the floor, a handle on the opposite rear end of said base bar, a piston rod rigidly mounted on said bar and extending upwardly and rearwardly therefrom, a stationary piston mounted at the top of said rod, an air cylinder slidably mounted on said stationary piston, a base block for said cylinder slidably mounted on said piston rod, a toe plate rigidly mounted on and extending forwardly from said base block, said toe plate extending forwardly beyond the forward end of said base bar and extending obliquely upwardly from the plane of said base bar, means for delivering air under pressure into the top of said cylinder so as to cause said air cylinder and therewith said base block and said toe plate to be raised upwardly with respect to said base bar, whereby, when said toe plate has been inserted between the tire and the wheel, with said hook on the forward end of said base bar engaging the top rim of the wheel, and said base bar has been brought down into resting position extending diametrically across the top side of the wheel, the delivery of air under pressure into said air cylinder will cause said toe plate to free the tire from the wheel, and spring means for returning said air cylinder and therewith said toe plate to normal position when the air is allowed to exhaust from said air cylinder.

References Cited in the file of this patent

UNITED STATES PATENTS

| | | |
|---|---|---|
| 1,260,587 | Sorrell | Mar. 26, 1918 |
| 1,336,916 | Osterhage | Apr. 13, 1920 |
| 2,281,476 | Casey | Apr. 28, 1942 |
| 2,563,987 | Colley | Aug. 14, 1951 |
| 2,792,878 | Sanford | May 21, 1957 |